Figure 2A:
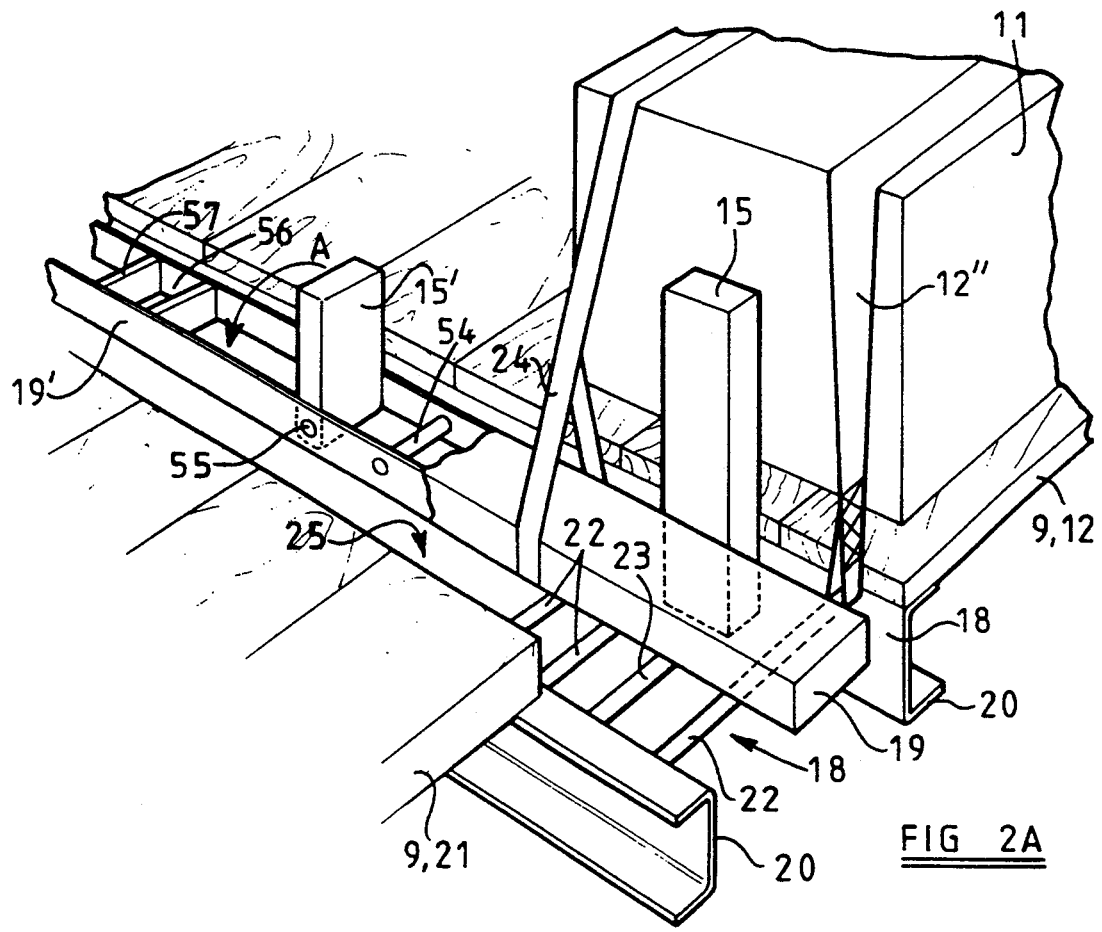

United States Patent [19]

Clive-Smith

[11] Patent Number: 5,398,832
[45] Date of Patent: Mar. 21, 1995

[54] LASHINGS IN FOLDING FLATRACK

[76] Inventor: Martin Clive-Smith, 66 Leam Terrace, Leamington Spa CV31 1BO, England

[21] Appl. No.: 143,447

[22] Filed: Oct. 26, 1993

[30] Foreign Application Priority Data

| Oct. 27, 1992 [GB] | United Kingdom | 9222507 |
| Dec. 22, 1992 [GB] | United Kingdom | 9226653 |
| Jun. 15, 1993 [GB] | United Kingdom | 9312257 |

[51] Int. Cl.⁶ .............................................. B65D 19/12
[52] U.S. Cl. ..................................... 220/1.5; 220/6; 220/651; 108/55.3
[58] Field of Search ............... 248/505; 108/55.1, 55.3, 108/55.5, 56.3; 206/386, 600; 220/1.5, 6, 7, 651

[56] References Cited

U.S. PATENT DOCUMENTS

| 1,044,667 | 11/1912 | Lachman | 220/651 |
| 3,626,872 | 12/1971 | Cully | 108/55.5 |
| 3,753,407 | 8/1973 | Tilseth | 108/55.5 |
| 3,874,546 | 4/1975 | Sanders | 220/6 |
| 4,015,710 | 4/1977 | Biggs | 108/55.5 |
| 4,886,694 | 12/1989 | Donnard | 108/55.5 |
| 4,911,318 | 3/1990 | Bishop | 220/1.5 |
| 4,966,085 | 10/1990 | Howe | 108/55.1 |

FOREIGN PATENT DOCUMENTS 9001007 2/1990 WIPO .................................. 220/600

Primary Examiner—Stephen J. Castellano
Attorney, Agent, or Firm—Ware, Fressola, Van Der Sluys & Adolphson

[57] ABSTRACT

A flatrack freight container is provided with cargo securing members within the platform area (1). The securing members optionally include stanchion sockets (18), pivoted stanchions (15'), abutments (19, 22, 38) for straps (24, 12, 31) or hooks (34, 35), or rings (29). The securing members lie below the platform surface (1) in recesses (27) or openings (18) [which may be longitudinal (36) or transverse (18)], conventionally provided to house demountable end wall structures (2) in the demounted condition.

27 Claims, 5 Drawing Sheets

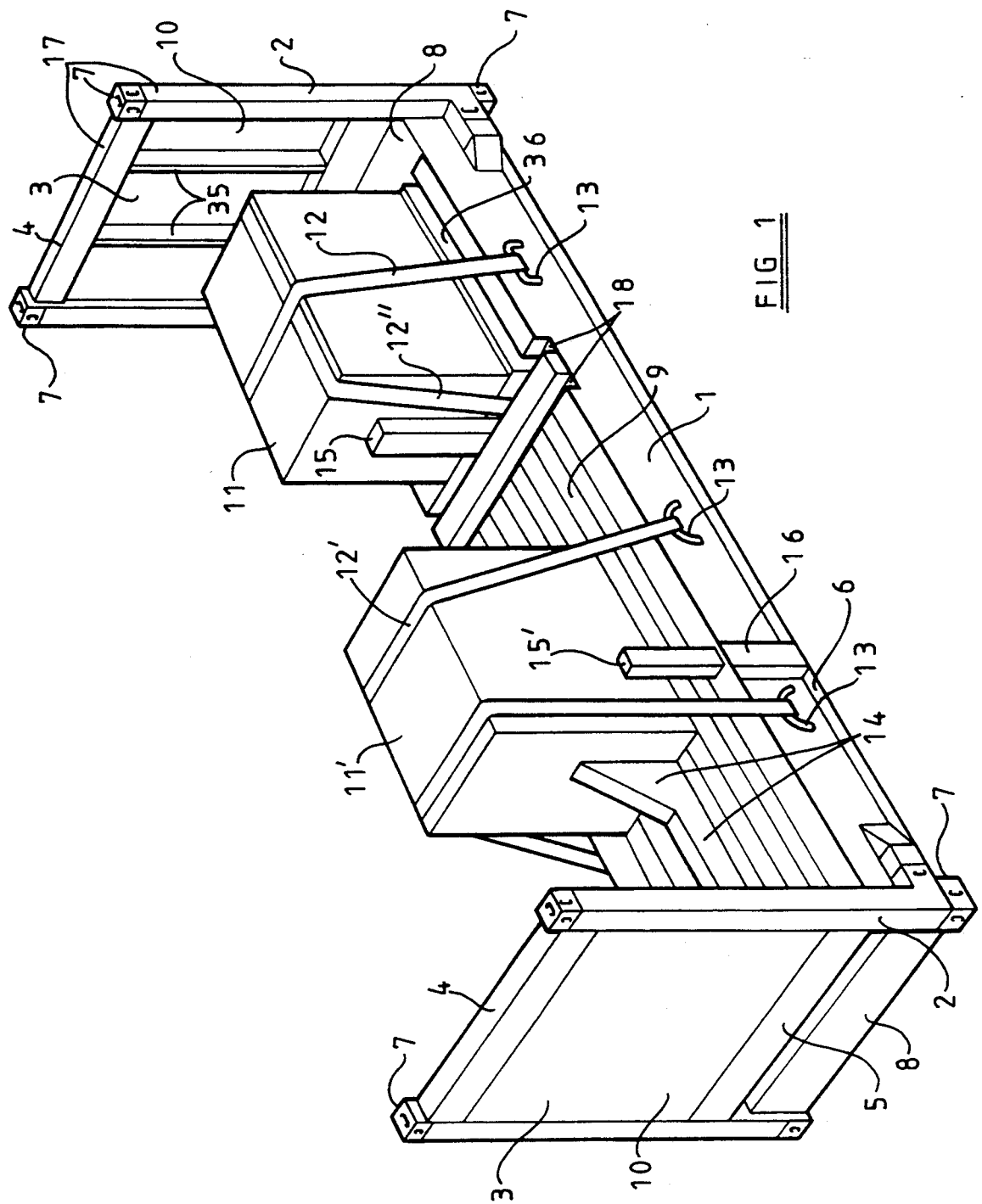

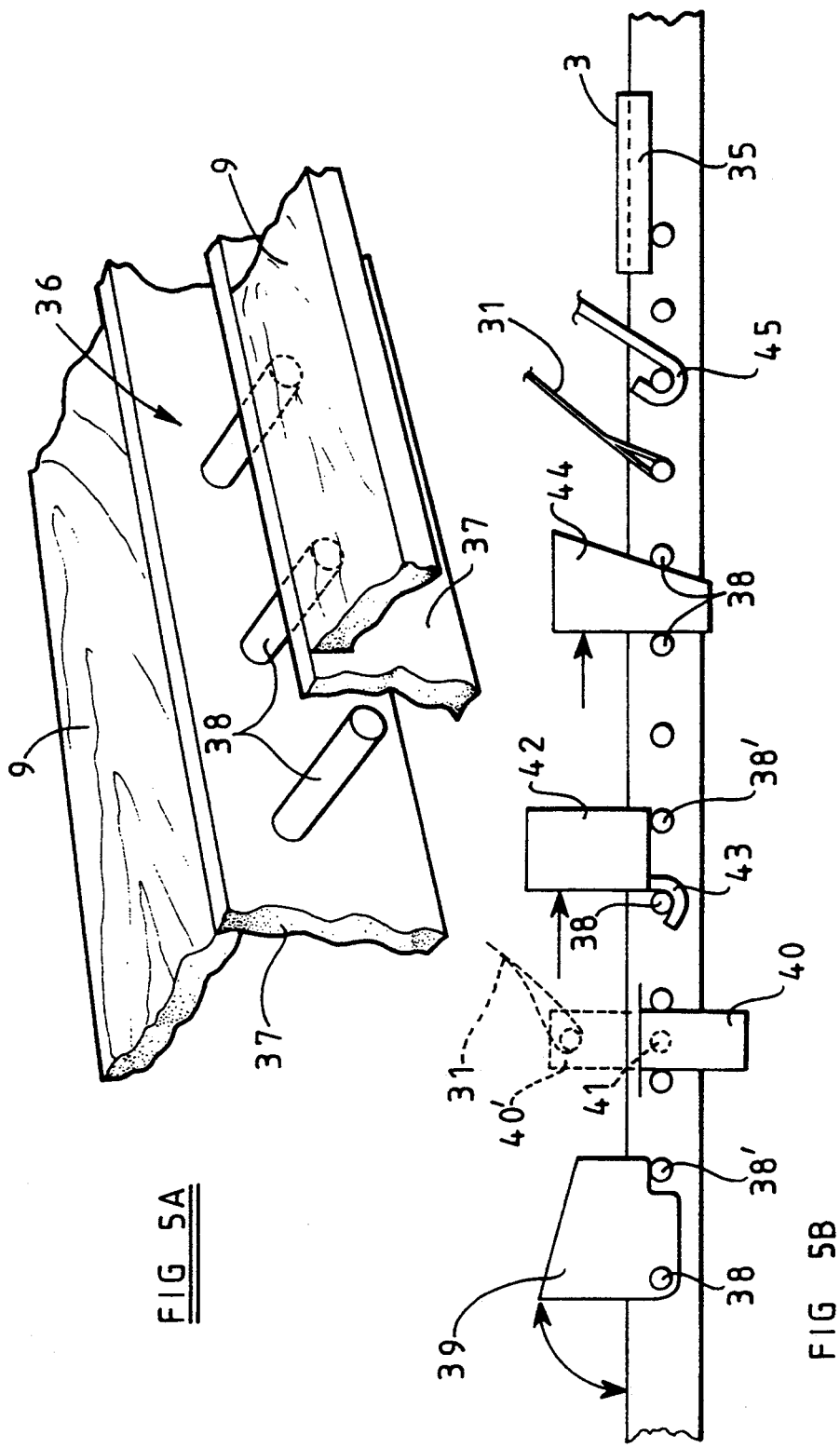

LASHINGS IN FOLDING FLATRACK

In the field of shipping containers there is a type of container or cargo carrier called a folding flatrack which comprises a horizontal platform base with a wall having vertical posts, typically one at each corner, with a panel and rails connecting the posts. The wall can either be locked in the vertical position or can be unlocked and folded down on to the base. Once the wall is folded the container can be stacked with other folded flatracks to enable economical storage and transport.

It is a desirable feature of a folding flatrack that once the wall is folded, the container can be used as a simple platform container whereby cargo can be placed on top of the wall. Since the walls do not normally cover the whole of the floor surface, it is desirable that the upper surface of the folded walls is more or less flush with the floor surface.

The strength requirements of a wall in the erect position are such that the cross beams are fairly bulky and thus when the wall is folded down, it is necessary to provide a space in the platform base to receive the rails. The space typically comprises a recess or opening in the floor surface to receive the frame members. The problem with the openings it that they generally comprise upward facing open channel sections in which dirt, old packaging and lashings accumulate necessitating a sweep out of the debris before the wall can be folded down. This might seem a simple procedure but typically there can be as many as 10 openings in one base which need attention. If they should not be cleaned, then the wall can become damaged when folded. Such openings or recesses are known prior art as in GB Patent 2060567B.

The major problem with platform containers is in the safe securing of cargo to the deck or base. In practice it is found that the longitudinal accelerations acting on such cargo carriers are 5 times greater than transverse so the relative importance of longitudinal restraint on the cargo cannot be over emphasised, yet until now the problem has not found an acceptable solution.

When securing cargo to a typical base it is not easy to provide longitudinal restraint for the cargo because the lashings for the cargo are located only on the sides and the end walls are too weak and too flexible to be used effectively. So large volumes of dunnaging comprising timbers chocked to the end corners and nailed to the floors and so on are used. This waste of timber resources is increasingly found unacceptable and the skill needed to secure the cargo hard to find. Also the nailing can damage the platform.

It would be more convenient, safer and economically viable if there was some other form of lashing point available to which commercially available stanchions and lashing devices could be fastened thereby cutting damage to platforms and cargo alike.

It is an object of the invention to provide improved means for securing cargo on a folding flatrack.

According to the present invention there is provided a folding flatrack comprising a platform base with one or more walls each comprising a framework of at least 2 posts and a connecting rail the framework being pivotally attached to the base, there being at least one recess formed in the floor of the base to receive at least part of the framework when the framework is folded down, there being provided within the recess means for securing cargo placed upon the floor of the flatrack.

Figure 2B:
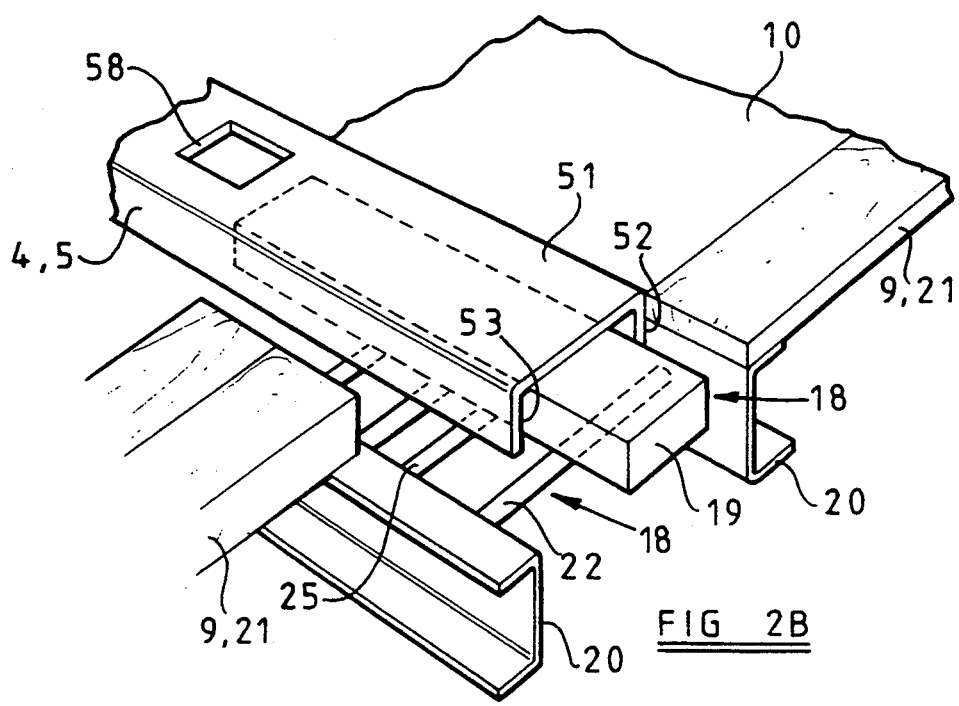
Figure 3A:
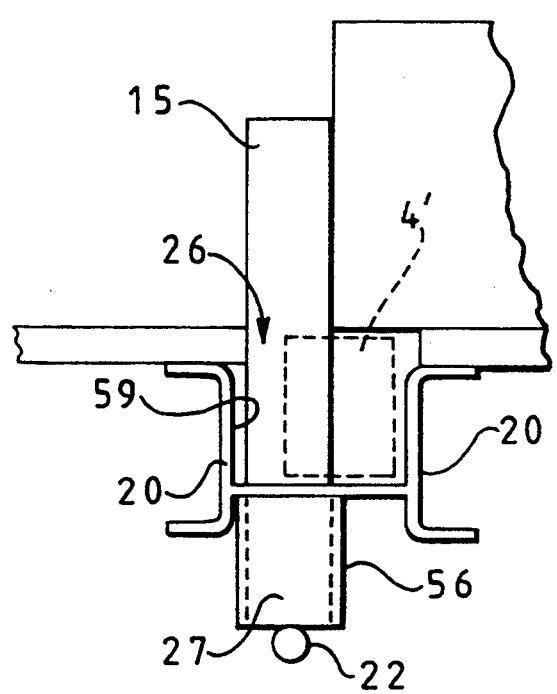
Figure 3B:
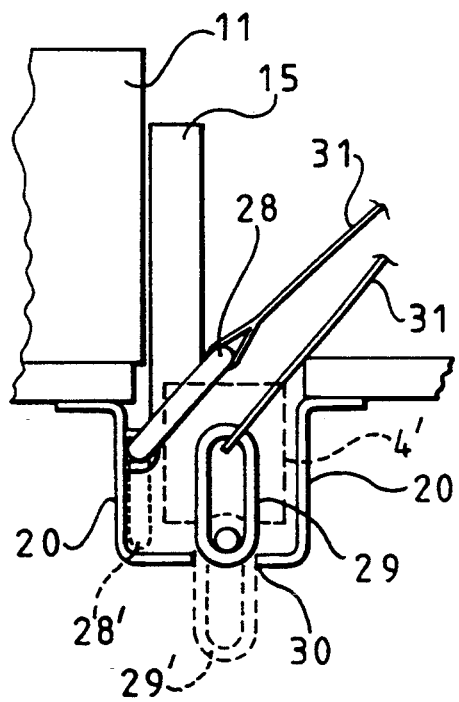
Figure 4:
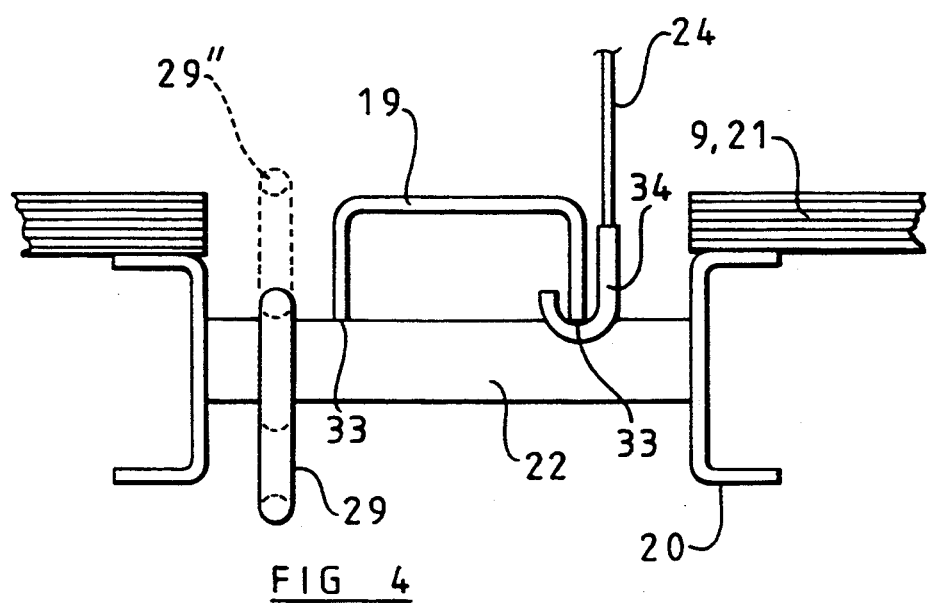
Figure 6A:
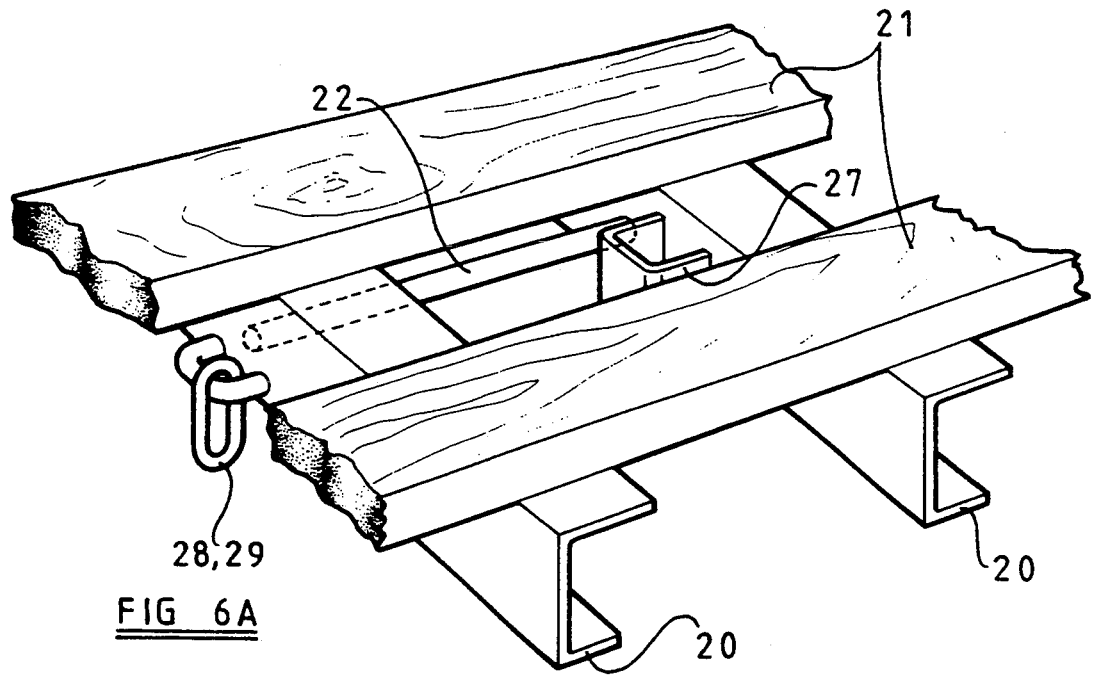
Figure 6B:
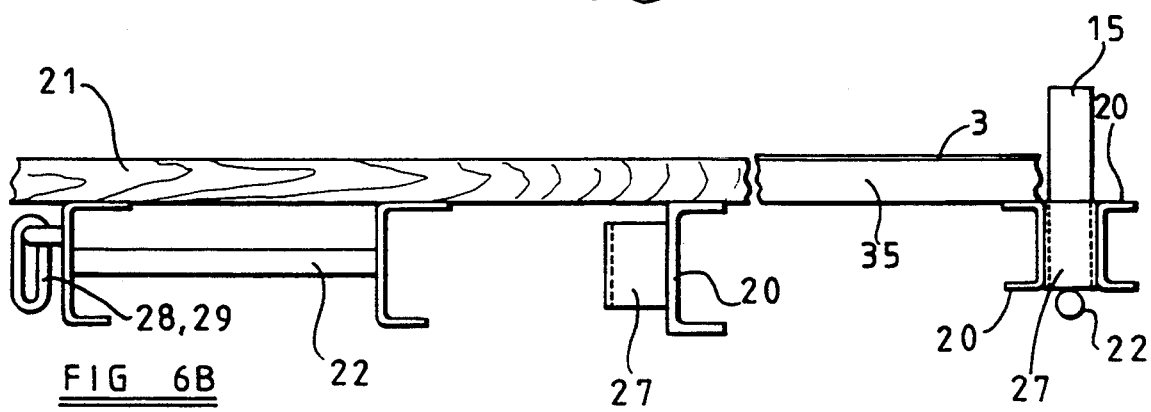
Figure 6C:
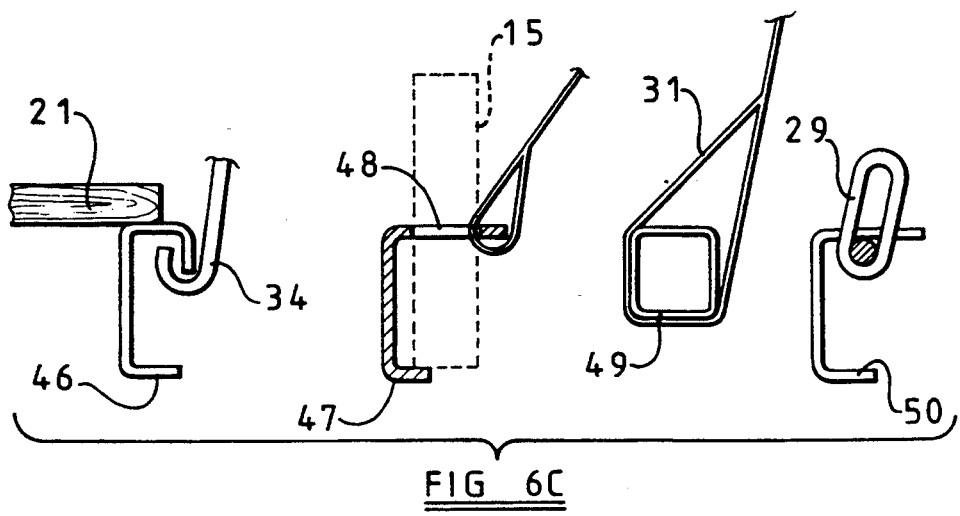

A specific embodiment of the invention will now be described by way of example with reference to the accompanying drawings in which:

FIG. 1 shows a perspective view of a folding flatrack in the erect position,

FIG. 2A shows a perspective view of a floor recess area with the structure cut away to reveal the workings of the arrangement, FIG. 2B shows a perspective view as FIG. 2A of the floor recess with the cargo removed and the end wall folded and top rail nested into the recess, FIGS. 3A and 3B show side elevation sections through the recess area revealing some lashing types, FIG. 4 shows as FIG. 3, revealing alternative or additional lashing features, FIG. 5A shows a perspective view of an embodiment of lashings in a recess formed longitudinally in the floor, FIG. 5B shows a vertical side section through the longitudinal recess of FIG. 5A, FIG. 6A shows a perspective view of an embodiment of lashings in another type of recess formed longitudinally in the floor, FIG. 6B shows a vertical side section through the longitudinal recess of FIG. 6A, FIG. 6C shows a vertical side section through the longitudinal recess of FIG. 6A.

Referring to FIG. 1, the flatrack has a base 1 comprising structural members side rails 6, sills 8, floor 9, cross members 19, floor members 20 and other parts later described. Walls 10 each comprise a panel 3 mounted on a framework 17 comprising corner posts 2 and cross rails comprising, top rail 4, bottom rail 5. At the top of each post 2 is a corner fitting 7. At the end of each side rail 6 there is a corner fitting 7. When the wall 10 is erect, cargo comprising a box 11' placed on the load surface of floor 9 is at present conventionally held in place by lashings 12 tied around the box 11' and fixed to the base 1 through hoops 13. To prevent the box 11' slipping longitudinally, typically the box 11 is supported by bracing 14 which can bear on the wall 10 or is nailed directly into the floor 9, being typically made of timber to receive nails for this purpose.

Attached to the base 1 side rails 6 are stanchion pockets 16, each comprising a hollow vertically aligned box open at the top. Stanchion pockets 16 are used as sockets to receive stanchion posts 15' to add further to cargo restraint.

The foregoing description is of currently conventional practice. This invention provides alternative securing means described below.

At the other end of the base 1 there is seen additional cargo in the form of box 11 which is lashed to the side rails 6 via lashing 12 and hoop 13. However to provide longitudinal restraint there are seen transverse recesses in the form of openings 18 formed in the floor 9 of base 1. Details of opening 18 will be shown in FIG. 2A. A stanchion post 15 is fixed into the opening 18 and a lashing 12" is anchored within the opening 18 and passed over the box 11 to hold it in place.

In FIG. 2A there is seen a close up view of the opening 18. In this example there are two adjacent through openings 18 each defined on one side by cross member 19 and the other by a floor member 20 which also provides support for the floor timber 21. The cargo box 11 sits on the floor 9 and lashings 12 wrap over the box 11 and are secured to cargo securing means comprising bars 22 within the openings 18.

The bars 22 typically comprise round bar of thick section to support high tensile lashing loads imposed on them by the lashings 12. Between 2 of the bars 22 there is seen cargo securing means comprising stanchion post 15 which is held between the sides of the opening 18 and thus projects upwards. To further support stanchion post 15 the bars 22 can be positioned to contact the side of stanchion post 15 as seen here to one side of post 15, and with under bar 23 to stop the post 15 dropping through to the ground. Thus all round support and underneath support for the stanchion post 15 can be provided.

Should the box 11 begin to slide along towards the stanchion post 15, and the lashings 12 not provide sufficient restraint through friction between box 11 and floor 9, then the stanchion post 15 will prevent the box 11 moving any further. Additional lashing 24 is seen wrapped around the cargo securing means comprising cross member 19 to provide alternative restraint.

The openings 18 are open to the ground denoted by arrow 25 seen through the openings 18. Thus dirt and debris drops through out of the way.

Although the openings 18 are in this case through openings, the principle of the invention can be applied to closed-off recesses as will be described later.

Stanchion post 15 might be attached to the base by a pivot or chain and be stowed within the opening 18 if not required.

Additional chocking between the stanchion post 15 and box 11 might be needed if the gap between them is large but at least there would be no need to nail such to the floor timber 21.

The cross member 19 and floor bearer 20 can be connected together by means other than the bars 22 or the bars 22 can be raised in strength so that the cross members and floor members act as one structure to support the lashing loads imposed on one or other of them.

An alternative shape to cross member 19 is member 19′ comprising an open section into which cargo securing means comprising lashing devices are incorporated such as bar 54 or a stanchion 15′ permanently and pivotally attached to member 19′ by a pin 55 which enables the stanchion 15′ to be raised as shown for cargo restraint and lowered as indicated by arrow A below or level with floor 9 within the member 19′. If lowered level with floor 9, then the uppermost surface of stanchion 15′ would then be available for supporting cargo placed upon it. A cargo securing means comprising stanchion socket 56 similar to socket 16 might be mounted between openings 18 as shown with its top supporting rim 57 substantially level with the surface of floor 9.

Cargo can be supported so as to overlie the cross member 19 or 19′ and lashed down to the means provided in the left hand opening 18 of FIG. 2A. The tight lashings again do not distort the edge of the load.

When the end walls 10 are folded down onto the base 1 as in FIG. 2B, the cross rails 4, 5 lie on and within the openings 18. The openings 18 can be enlarged over and above the needs to accommodate the cross rails 4, 5 thereby allowing access to at least part of the opening 18 for lashing and insertion of stanchion posts 15. The shape of the typical cross rails 4, 5 is seen to be channel shaped comprising base web 51 and flanges or limbs 52,53. The flanges 52,53 lie inside the openings 18 and the web 50 lies substantially flush with floor 9. A stanchion socket 58 might be formed in the cross rail 4, 5 which can be used here in the folded position.

In FIG. 3A the recess or opening 26 is shaped in an alternative manner. The opening 26 has no cross member 19 but is formed from 2 floor members 20. This arrangement allows a cross rail 4′ to be of a box section yet fold down into the opening 26 so as to not project substantially above the surface of floor 9. A stanchion socket 27 is mounted between the floor members 20 and incorporates for example a lashing bar 22. The cargo securing means comprising lashing bars 22 and stanchion socket 27 are set below the position of a cross rail 4′ which when folded would occupy the space denoted by the dotted rectangle. By positioning the socket 27 close to the side 59 of the opening 26 cargo 11 bearing on the stanchion 15 in a substantially shearing action on the stanchion is better supported since the stanchion 15 abuts the floor timber 21 and/or floor member 20. If the stanchion 15 were cantilevered out from a position at the bottom of opening 27, support of cargo 11 would involve the action of bending as well as shear forces.

The recess or opening 26 might be open or closed as seen in FIG. 3B to the ground depending on requirements.

In FIG. 3B additional cargo securing means comprising lashing rings 28,29 are seen set into the floor members 20 and closing plate 30. When in use the position of the lashing lings 28,29 is seen in FIG. 3B in full line with lashings 31 secured to them. When not in use, the rings 28,29 drop to the positions indicated in the dotted lines 28′,29′ and are thus free of the folded position of the cross rail 4′.

Ring 28 can in the position shown house a stanchion post 15 to restrain cargo such as a box 11.

In FIG. 4 a side elevation of an alternative arrangement of the lashing opening is shown. A cross member 19 is seen to comprise a channel section with flanges 32 aligned vertically with their free edges 33 underneath the cargo securing means. These free edges 33 are particularly useful in retaining known hooks 34 which are then attached to lashings 24 for taking over cargo not seen here. Cargo securing means comprising lashing rings 29 can be fitted over bars 22. The ring 29 is seen here in the stowed position but can be raised up to position in dotted line 29″ being accessible then to lashings and hooks such as 24, 34 respectively.

In FIG. 1 there can be seen vertical rails 35 used to stiffen the panel 3 on the inner face. When the wall 10 is folded down onto the base 1, it is necessary and typical to provide longitudinal openings 36 to receive the vertical rails 35 to enable the wall 10 to fold flush with the floor 9. Thus in a similar manner to the openings 18, the openings 36 can be fitted out with cargo securing means comprising lashings, bars, stanchions and stanchion sockets as earlier described. One advantage of the longitudinal openings 36 is that a plurality of longitudinal positions can be provided. This is illustrated in FIG. 5A.

In FIG. 5A, a perspective view of an embodiment of lashings in the opening 36 is shown. There is seen the floor 9 and the opening 36. The opening 36 is formed from 2 steel sections 37 and fixed across the opening 36 to the sections 37 are a number of bars 38 used for lashing.

In FIG. 5B there is seen a vertical section drawn through the bars 38. The bars 38 are set below the level of the vertical rails 35 a small section of which is shown in FIG. 5B in the folded position. A piece of the panel 3 is also illustrated. The bars 38 can be used for hinged stanchions 39 attached pivotally to the bar 38 and raised from a recessed position to abut another bar 38'. Alternatively there are drop stanchions 40 which can be raised to position 40' and perhaps conveniently held in the up position 40' by tension in a lashing such as 31 looped through a bar 41 fixed to the stanchion 40. Another cargo chocking method might be the use of a hook stanchion 42 which has a hook 43 to engage bar 38 and abuts bar 38'. Wedge shaped stanchions as 44 might be dropped between 2 bars 38. Hooks 45, lashings 31 and so on can find convenient positions along the length of the opening 36.

In FIGS. 6A and 6B the opening 36 is formed by the simple removal of part of the floor timber 21. The floor timber 21 is supported by floor bearers 20. A section of the panel 3 and vertical rail 35 is seen in the folded position. To provide cargo securing means comprising lashing and stanchion points in this example of opening 36, bars 22, stanchion sockets 25, lashing rings 28,29 and others as described earlier are envisaged to be connected to the floor bearers 20. Two bearers 60 placed close by each other back-to-back form the basis of another stanchion socket 27 shown with stanchion 15 inserted.

In FIG. 6C the floor bearers 20 have been shaped to be more suitable for lashing to themselves. All the cargo securing means comprising lashings lie below the depth required by the vertical rail 35 or other parts of wall 10 folding into it. Bearer 46 has a downward lip to engage a hook, bearer 47 has its top flange formed with a cut out 48 so as to receive a stanchion post 15 (shown in dotted line) or lashing 31. Bearer 49 is formed with rounded edges perhaps as a tube to suit lashing 31 and bearer 50 has a lashing ring 29 built into it.

In the foregoing examples, the openings or recesses are either longitudinal or transverse. It will be appreciated that the various features described in relation to longitudinal recesses could be applied to transverse recesses and vice versa.

It will be seen that the invention offers a number of alternative or complementary ways of securing freight within the area of the platform, capable of withstanding longitudinal accelerations.

I claim:

1. A folding flatrack comprising an elongate platform having a load carrying deck, at least one folding wall selectively foldable between an upstanding deployed position and a folded stowed position contiguous with the deck of the platform, said folding wall having a first platform-facing face and having a structural framework projecting from said platform-facing face, said folding wall having a second outer face comprising a panel devoid of projections and adapted to provide a load-carrying surface substantially flush with said deck of the platform when the folding wall is in the folded stowed position, said elongate platform being recessed to receive said structural framework of the folding wall when the folding wall is in said folded stowed position, and cargo securing means being provided within said recessed platform and being accessible for use in securing cargo at least when the folding wall is in the upstanding deployed position.

2. A folding flatrack according to claim 1 wherein said cargo securing means are also afforded when the wall is in the folded position contiguous with the platform.

3. A folding flatrack according to claim 1 wherein the cargo securing means comprise an abutment around which a strap can be secured.

4. A folding flatrack according to claim 1 wherein the cargo securing means comprise a captive ring.

5. A folding flatrack according to claim 1 wherein the cargo securing means comprise a pivotable stanchion.

6. A folding flatrack according to claim 1 wherein the elongate platform is recessed transversely.

7. A folding flatrack according to claim 6 wherein the elongate platform is recessed by two parallel transverse openings and said elongate platform has a parallel cross member support structure flush with the platform and disposed between said two parallel transverse openings.

8. A folding flatrack according to claim 7 wherein said parallel transverse openings define stanchion receiving socket means.

9. A folding flatrack according to claim 8 wherein the stanchion receiving socket means abut the platform deck.

10. A folding flatrack according to claim 7 wherein a portion of said cross member support structure is demountable to define a stanchion.

11. A folding flatrack according to claim 10 wherein said portion of said cross member support structure is pivotally mounted.

12. A folding flatrack according to claim 7 wherein said cross member support structure provides an abutment around which a strap can be secured.

13. A folding flatrack according to claim 7 wherein said cross member support structure provides an abutment to which a hook can be secured.

14. A folding flatrack according to claim 1 wherein the recesses of said recessed platform comprise through apertures.

15. A folding flatrack comprising an elongate platform having a load carrying deck, at least one folding wall selectively foldable between an upstanding deployed position and a folded stowed position contiguous with the deck of the platform, said folding wall having a first platform-facing face and having a structural framework comprising at least one longitudinal rail projecting from said platform-facing face, said folding wall having a second outer face comprising a panel devoid of projections and adapted to provide a load carrying surface substantially flush with said deck of the platform when the folding wall is in the folded stowed position, said elongate platform being recessed to provide at least one longitudinal opening adapted to receive said longitudinal rail when the folding wall is in the folded stowed position and cargo securing means being provided within said longitudinal opening of the platform and being accessible for use in securing cargo at least when the folding wall is in the upright deployed position.

16. A folding flatrack according to claim 15 wherein said cargo securing means are also afforded when the wall is in the folded position contiguous with the platform.

17. A folding flatrack according to claim 15 wherein the cargo securing means comprise an abutment around which a strap can be secured.

18. A folding flatrack according to claim 15 wherein the cargo securing means comprise a captive ring.

19. A folding flatrack according to claim 15 wherein the cargo securing means comprise a pivotable stanchion.

20. A folding flatrack according to claim 15 wherein said longitudinal opening comprises a through aperture.

21. A folding flatrack comprising an elongate platform having a load carrying deck, at least one folding wall selectively foldable between an upstanding deployed position and a folded stowed position contiguous with the deck of the platform, said folding wall having a first platform-facing face and having a structural framework including a cross rail projecting from said platform-facing face, said cross rail being of channel cross-section having a pair of limbs connected by a base web, said folding wall having a second outer face comprising a panel devoid of projections and adapted to provide a load carrying surface substantially flush with said deck of the platform when the folding wall is in the folded stowed position, said elongate platform being recessed to provide a pair of transverse openings adapted to receive said respective limbs of the channel cross-section cross rail of said folding wall when the folding wall is in said folded stowed position, and cargo securing means being provided within said recessed platform and being accessible for use in securing cargo at least when the folding wall is in the upstanding deployed position.

22. A folding flatrack according to claim 21 wherein said pair of transverse openings comprise through apertures.

23. A folding flatrack according to claim 21 wherein the elongate platform has a cross-member support structure flush with the platform and wherein said pair of transverse openings are disposed on opposite sides of said cross-member support structure.

24. A folding flatrack according to claim 21 wherein said cargo securing means are also afforded when the wall is in the folded position contiguous with the platform.

25. A folding flatrack according to claim 21 wherein the cargo securing means comprise an abutment around which a strap can be secured.

26. A folding flatrack according to claim 21 wherein the cargo securing means comprise a captive ring.

27. A folding flatrack according to claim 21 wherein the cargo securing means comprise a pivotable stanchion.

* * * * *